United States Patent [19]

Sheppard

[11] 3,878,140

[45] Apr. 15, 1975

[54] ACRYLIC COATING COMPOSITION FOR REFINISHING FLEXIBLE SUBSTRATES

[75] Inventor: Ronald J. Sheppard, Flushing, Mich.

[73] Assignee: E. I. du Pont de Nemours and Company, Wilmington, Del.

[22] Filed: July 9, 1974

[21] Appl. No.: 486,897

Related U.S. Application Data

[63] Continuation-in-part of Ser. No. 285,094, July 30, 1972, Pat. No. 3,829,397.

[52] U.S. Cl. ......... 260/17 R; 117/73; 117/138.8 A; 117/138.8 D; 117/138.8 UA; 117/161 C; 117/161 UZ; 117/161 UN; 117/161 UC; 260/23 AR; 260/31.8 M; 260/31.8 G; 260/32.8 N; 260/33.2 R; 260/33.4 R; 260/33.6 UA; 260/895; 260/901

[51] Int. Cl.... C08b 21/08; C08f 37/18; C08f 37/06; C08f 45/38

[58] Field of Search.. 260/901, 895, 23 AR, 32.8 N, 260/17 R, 31.8 M, 31.8 G, 31.8 AN

[56] References Cited
UNITED STATES PATENTS

| | | | |
|---|---|---|---|
| 3,037,006 | 5/1962 | Hankins et al. | 260/80.5 |
| 3,488,307 | 1/1970 | Walus et al. | 260/23 AR |
| 3,553,124 | 1/1971 | Donatello et al. | 260/23 AR |
| 3,711,433 | 1/1973 | Willey | 260/17 R |
| 3,753,935 | 8/1973 | Miller | 260/31.8 M X |
| 3,832,217 | 8/1974 | Sato et al. | 260/17 R |

*Primary Examiner*—Melvin Goldstein
*Assistant Examiner*—W. C. Danison

[57] ABSTRACT

The coating composition is useful for repairing the finish of flexible automobile and truck bumpers and comprises a mixture of A. a blend of the following polymers:
 1. a copolymer of methyl methacrylate and an alkyl acrylate or an alkyl methacrylate having 2–12 carbon atoms in the alkyl groups;
 2. a copolymer of methyl methacrylate and an adhesion promoting monomer such as 3-(2-methacryl-oxyethyl)-2,2 spiro cyclohexyl oxazolidine;
 3. a plasticizer which is either a phthalate ester such as butyl benzyl phthalate or butyl cyclohexyl phthalate or an alkyd resin; and B. a pigmented acrylic composition of
 1. polymethyl methacrylate or a copolymer of methyl methacrylate or a mixture of these polymers;
 2. cellulose acetate butyrate; and
 3. an organic plasticizer.

4 Claims, No Drawings

ACRYLIC COATING COMPOSITION FOR REFINISHING FLEXIBLE SUBSTRATES

CROSS REFERENCE TO RELATED APPLICATIONS

This application is a continuation-in-part of Ser. No. 285,094 filed July 30, 1972, now U.S. Pat. No. 3,829,397.

BACKGROUND OF THE INVENTION

This invention is related to a polymeric coating composition and in particular, to a polymeric coating composition that is useful for refinishing flexible substrates.

The automobile and truck manufacturing industry is utilizing bumpers coated with a flexible material such as a high density polyurethane foam, a hydrocarbon rubber or polyvinyl chloride. These flexible bumpers are coated in the factory with a primer and a topcoat that requires baking to cure the resulting finish. But when these automobile or truck bumpers become damaged in use, an air dry refinish composition is preferred for low cost maintenance. The novel coating composition of this invention has air drying characteristics and adheres to the primed flexible substrate of the bumper and also to the factory applied topcoat of the bumper. Also, the novel coating composition can be blended with other pigmented acrylic compositions to form a high quality finish for flexible bumpers.

SUMMARY OF THE INVENTION

The coating composition of this invention comprises 40 to 60 percent by volume, based on the total volume of the coating composition, of Composition I and correspondingly, 60 to 40 percent by volume of Composition II;

Wherein Composition I consists essentially of 10–50 percent by weight of film forming binder and correspondingly 90–50 percent by weight of an organic solvent for the binder wherein the binder consists essentially of 1. 35 – 65 percent by weight, based on the weight of the binder, of a copolymer consisting essentially of 80 – 90 percent by weight of methyl methacrylate and correspondingly 10 – 20 percent by weight of an alkyl acrylate or an alkyl methacrylate having 2 – 12 carbon atoms in the alkyl groups;
2. 5 – 20 percent by weight, based on the weight of the binder, of a copolymer consisting essentially of 85 – 98 percent by weight of methyl methacrylate and 2 – 15 percent by weight of a polymerized adhesion promoting monomer of the formula

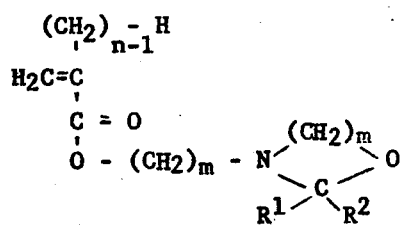

where $n$ is 1 – 2, $m$ is 2 – 3 and $R^1$ and $R^2$ are hydrogen, phenyl, benzyl, an alkyl group having 1 – 12 carbon atoms, or in combination are 2,2 spirocyclohexyl; and 3. 30 – 50 percent by weight, based on the weight of a binder, of an organic plasticizer which is either a phthalate ester such as butyl benzyl phthalate or butyl cyclohexyl phthalate or an alkyd resin such as a 35 percent coconut oil, 65 percent glycerol phthalate alkyd resin and wherein Composition II comprises a pigmented coating composition containing 0.1 – 20 percent by weight pigment and 10 – 50 percent by weight of a film forming binder which consists essentially of 1. 40 – 75 percent by weight, based on the weight of the binder, of polymethyl methacrylate or a copolymer of methyl methacrylate or a mixture of polymethylmethacrylate and a copolymer of methyl methacrylate;
2. 10 – 30 percent by weight, based on the weight of the binder, of cellulose acetate butyrate having a 0.1 – 20 second viscosity and a butyryl content of 30 – 55 percent by weight; and
3. 15 – 30 percent by weight, based on the weight of the binder, of an organic plasticizer.

DESCRIPTION OF THE INVENTION

The Composition I used in this invention contains about 10 – 50 percent by weight of the film forming binder and correspondingly about 90 – 50 percent by weight of an organic solvent for the binder. The composition can contain a 0.1 – 20 percent by weight pigment but preferably is utilized as a clear composition.

The film forming binder utilized in Composition I used in this invention contains a blend of acrylic polymers and a plasticizer. The acrylic polymers have a relative viscosity of about 1.03 – 1.50, preferably about 1.10 – 1.25. The relative viscosity is a value obtained by dividing the efflux time of the solution of the polymer by the efflux time of a solvent used to form the solution. The efflux times are measured according to the procedure of ASTMD-445-46 T method B. The polymer solution used is 0.25 grams of the polymer dissolved in 50 cubic centimeters of ethylene dichloride solvent. The efflux times are measured at 25°C. using standard apparatus sold under the designation of a modified Ostwald viscometer.

These acrylic copolymers are prepared by conventional polymerization techniques in which the monomers, the solvents, and polymerization catalysts are charged into a reaction vessel and the reaction mixture is heated to about 50° – 200°C. and reacted from about 1 to 6 hours to form a polymer having the aforementioned viscosity range.

The following are typical of polymerization catalysts which can be used to prepare these polymers such as azo, bis-isobutyronitrile, azo-bis-($\alpha$, gamma-dimethylvaleronitrile), benzoyl peroxide, t-butylperoxypivalate, di-tertiary - butyl peroxide and the like.

Typical solvents which are used to prepare the acrylic polymers utilized in this invention are toluene, xylene, butylacetate, acetone, methylisobutylketone, methylethyl ketone, butyl alcohol, and other aliphatic, cycloaliphatic, aromatic hydrocarbons, esters, ethers, ketones and alcohols.

The Composition I used in this invention contains 35 – 65 percent by weight, based on the weight of the binder of a copolymer of 80 – 90 percent by weight of methyl methacrylate and correspondingly 10 – 20 percent by weight of an alkyl acrylate or an alkyl methacrylate that has 2 – 12 carbon atoms in the alkyl groups. Preferably, the composition contains 46 – 56 percent by weight, based on the weight of the binder, of this copolymer.

Typical alkyl acrylates or alkyl methacrylates that can be utilized in preparing this copolymer are ethyl acrylate, propyl acrylate, butyl acrylate, isobutyl acrylate, hexyl acrylate, 2 ethyl hexyl acrylate, nonyl acrylate, pentyl acrylate, lauryl acrylate, ethyl methacrylate, propyl methacrylate, butyl methacrylate, isobutyl methacrylate, hexyl methacrylate, 2 ethyl hexyl methacrylate, octylmethacrylate, nonyl methacrylate, pentyl methacrylate and lauryl methacrylate.

One preferred copolymer contains 82 percent by weight of methyl methacrylate and 18 percent by weight of butyl acrylate.

Composition I contains 5–20 percent by weight and preferably 10–14 percent by weight of an adhesion promoting copolymer of 85–98 percent by weight of methyl methacrylate and 2–15 percent by weight of the adhesion promoting monomer.

The adhesion promoting monomer utilized in the above copolymer has the following formula:

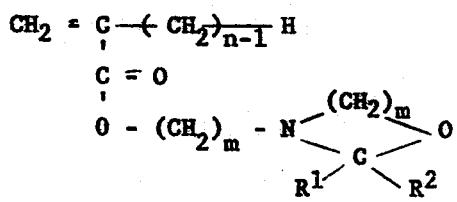

wherein $n$ is 1–2 and $m$ is 2–3, $R^1$ and $R^2$ are hydrogen, phenyl, benzyl or an alkyl group having 1–12 carbon atoms or in combination are 2,2-spirocyclohexyl. Typical compounds of this type are 3-(2-methacryloxyethyl)-2,2-spirocyclohexyl oxazolidine, 3-(2-ethylacryloxymethyl)-2,2-spirocyclohexyl oxazolidine and the like. The preferred compound is 3-(2-methylacryloxyethyl)-2,2-spirocyclohexyl oxazolidine. Preparation of these adhesion promoting monomers is in Hawkins et al. U.S. Pat. No. 3,037,006 issued May 29, 1962.

Composition I contains 30–50 percent by weight, and preferably 38–42 percent by weight of a plasticizer which is either phthalate ester plasticizer or an alkyl resin plasticizer. Typical phthalate ester plasticizers that can be used are aromatic phthalate esters or cycloaliphatic phthalate esters such as butyl benzyl phthalate or butyl cyclohexyl phthalate.

Typical alkyd resins which can be used are the reaction product of nondrying oil fatty acids, a polyhydric alcohol, dicarboxylic acid or its anhydride. Typical nondrying oil fatty acids which can be used are cottonseed oil fatty acids, castor oil fatty acids, coconut oil fatty acids, and the like. Typical polyhydric alcohols that can be used are glycerin, pentaerythritol, trimethylolethane, trimethylolpropane, glycols such as ethylene glycol, propylene glycol, butanediol, pentanediol and the like. Typical dicarboxylic acids or the anhydrides thereof that can be used to prepare this alkyd resin plasticizer are phthalic acid, phthalic anhydride, isophthalic acid, terephthalic acid, adipic acid, sebacic acid, succinic acid, maleic acid, maleic anhydride, fumaric acid and the like.

It may be desirable to incorporate a small portion of mono-carboxylic aromatic acid into the alkyd resin plasticizer. Typical acids that can be used are benzoic acid, paratertiarybutylbenzoic acid, phenylacetic acid, triethyl benzoic acid and the like.

The alkyd plasticizers are utilized in Composition I preferably have an acid number of about 2 – 14, preferably about 5–14, and are about 5–7 acid number units from the gel point of the alkyd resin.

One preferred alkyd resin used in Composition I is the esterification product of coconut oil, ethylene glycol and phthalic acid or phthalic anhydride and the resulting product contains 35 percent coconut oil/61 percent ethylene glycol phthalate/4 percent ethylene glycol.

Polyester plasticizers can also be used. Any of the aforementioned polyhydric alcohols and dicarboxylic acids can be used to form these polyesters. Also, small amounts of the above monocarboxylic acids can be incorporated into these polyesters. Typically useful polyester plasticizers are as follows: adipic acid/phthalic anhydride/ethylene glycol/benzoic acid in a molar ratio of 1.5/1.5/4.0/1.9; adipic acid/phthalic anhydride/ethylene glycol/neopentyl glycol/benzoic acid in a weight ratio of 36/27.5/15.3/17.4/3.8 which is modified with propylene imine.

Composition I used in this invention preferably is utilized as a clear coating but can be pigmented with any of the conventional pigments. Typical pigments which can be used are metallic oxides such as titanium dioxide, iron oxide, zinc oxide and the like, metal hydroxides, metal flakes such as aluminum flake, metal powders, chromates, sulfates, carbonates, carbon black, silica, talc, phthalocyanine blues and greens, and other organic pigments and dyes.

About 40–60 percent by volume of Composition I is blended with corresponding 60–40 percent by volume of a pigmented Composition II. These pigmented coating compositions generally contain 0.1–20 percent by weight of pigment and 10–50 percent by weight of the film forming binder. Any of the aforementioned pigments can be used therein.

Composition II contains 10–50 percent by weight of a film-forming binder of 1. 45–75 percent by weight, based on the weight of the binder, of polymethyl methacrylate or a copolymer of methyl methacrylate or a mixture of polymethyl methacrylate and a copolymer of methyl methacrylate;

2. 10–30 percent by weight, based on the weight of the binder, of cellulose acetate butyrate that has a 0.1–20 seconds viscosity, preferably 0.5–4 seconds viscosity, which is measured at 25°C according to ASTM D-1343-56 and has a butyryl content of about 30–55 percent by weight; and 3. 15–30 percent by weight, based on the weight of the binder, of an organic plasticizer such as those organic plasticizers mentioned above and in particular phthalate ester plasticizers and alkyd resin plasticizers.

One preferred pigmented Composition II of this type contains 1. 15–30 percent by weight, based on the weight of the binder, of polymethyl methacrylate;

2. 5–15 percent by weight, based on the weight of the binder, of the copolymer of methyl methacrylate and diethyl aminoethyl methacrylate;

3. 25–35 percent by weight, based on the weight of the binder, of a copolymer of methyl methacrylate and butyl acrylate;

4. 15–30 percent by weight of cellulose acetate butyrate having a 1 to 3 second viscosity and a butyryl content as indicated above; and 5. 20–30 percent by weight, based on the weight of the binder, of a plasticizer of an alkyd resin of coconut oil/ethylene glycol phthalate as described above or butyl benzyl phthalate.

The novel coating composition is applied by conventional techniques such as spraying, electrostatic spraying, dipping, brushing, flow coating and the like to a flexible substrate. The novel composition can be applied to a variety of flexible substrates such as filler panels, moldings, extension panels and the like. But the primary use for the novel coating composition of this invention is to refinish flexible bumpers which are coated with one of the following: a high density polyurethane foam, a hydrocarbon rubber such as an ethylene-propylene terpolymer sulfur curable elastomer, styrene/butadiene rubber, polyvinyl chloride and the like.

Preferably, the technique that is used to refinish bumpers is to apply a clear coating of Composition I of this invention about 0.1–1.0 mils in thickness and then allow this coating to air-dry and then apply a second pigmented coating of the novel coat of composition of this invention about 1–4 mils in thickness and then allow this coating to air-dry. This second pigmented coating is a blend of the clear coating composition and a pigmented coating composition.

The novel coating composition of this invention provides a finish upon drying which is durable, flexible and glossy and makes an attractive finish for flexible automotive and truck bumpers. The adhesion of the novel composition is particularly good to the primed flexible bumper substrate and the novel composition also has good adherence to an enamel or a lacquer coating which was originally used to coat the flexible bumper. These characteristics along with the air-drying properties of the novel coating composition of this invention makes the composition particularly attractive as a refinish for flexible automotive and truck bumpers and other flexible automobile and truck parts.

The following examples illustrate the invention. All quantities are shown on a weight basis unless otherwise specified.

EXAMPLE 1

The coating composition is prepared by blending together the following ingredients:

| | Parts by Weight |
|---|---|
| Ethylene glycol monoethyl ether acetate | 529 |
| V. M and P naphtha | 1646 |
| Butyl acetate | 1800 |
| Methyl ethyl ketone | 1845 |
| Butyl benzyl phthalate | 880 |
| MMA/MESO copolymer solution (40% copolymer solids of a 95/5 copolymer of methyl methacrylate/ 3-(2-methacryloxyethyl) - 2,2-spiro cyclohexyl oxazolidine in a 24/76 acetone/toluene solvent blend) | 660 |
| MMA/BA copolymer solution (40% copolymer solids of | 2640 |

-Continued

| | Parts by Weight |
|---|---|
| a methyl methacrylate/ butyl acrylate, 82/18 copolymer, in a solvent blend of 66.7% toluene/24.4% butyl acetate/ 8.9% methyl ethyl ketone) | |
| Total | 10,000 |

The above ingredients are thoroughly blended together to form a clear coating composition which has a binder solids of about 22%.

A white acrylic lacquer is prepared as follows:

| | Parts by Weight |
|---|---|
| Portion 1 | |
| Acetone | 10.70 |
| Ethylene glycol monoethyl ether acetate | 24.20 |
| Toluene | 25.00 |
| Alkyd resin plasticizer (35% coconut oil/61% ethylene glycol phthalate/4% ethylene glycol) | 62.00 |
| Portion 2 | |
| Polymethyl methacrylate solution (40% polymer solids in a solvent of 67% toluene/ 33% acetone) | 119.40 |
| MMA/DEAM copolymer solution (40% polymer solids of a copolymer of 99% methyl methacrylate/1% diethyl amino ethyl methacrylate in a solvent of 33/67 acetone/toluene) | 50.90 |
| MMA/BA copolymer solution (40% polymer solids of a copolymer of methyl methacrylate/butyl methacrylate, 82/18, in a solvent of 17% acetone/83% toluene) | 184.90 |
| Cellulose acetate butyrate solution (25% solids of cellulose acetate butyrate having a butyryl content of 38% and a 2-second viscosity in a 30/70 acetone/toluene solvent) | 196.20 |
| Portion 3 | |
| White mill base (55% solids dispersion of titanium dioxide dispersed with a resin blend of a methacrylate resin and cellulose acetate butyrate in toluene and ethylene glycol monoethyl ether acetate) | 187.60 |
| Total | 568.70 |

The above portions 1 – 3 are blended together in the order indicated to form the lacquer.

A refinish composition is prepared by thoroughly blending together the following ingredients:

| | Parts by Volume |
|---|---|
| Clear coating composition (prepared above) | 100 |
| White acrylic lacquer (prepared above) | 100 |
| Lacquer thinner (25.50% acetone/ 11.52% isopropanol/31.40% toluene/11.13% xylene/20.48% ethylene glycol monoethylether acetate) | 150 |
| Total | 350 |

A primed flexible bumper of a high density polyurethane foam reinforced with a steel member (replacement part) is sanded to provide a uniformly roughened surface. (An unsanded surface can also be used.) The clear coating composition prepared above is then sprayed onto the bumper and air-dried for 1 minute providing a finish of about 0.5 mil thick. The refinish composition prepared above is then sprayed onto the bumper and air-dried providing a finish about 2½ mils in thickness. The resulting finish has excellent adhesion to the substrate, good flexibility and a high gloss and is considered an acceptable finish for automotive bumpers.

High density polyurethane foam bumper which has previously been finished by the original equipment manufacturer with an enamel is sanded (an unsanded enamel surface can also be used) and the clear coat prepared above and the above refinish composition are applied as above and the resulting finish has good adhesion to the substrate, is flexible and glossy and forms an acceptable automotive refinish product. Similarly, lacquer finished polyurethane foam bumpers can be refinished as above.

Similar results are obtained with "Nordel" rubber coated bumpers and styrene/butadiene rubber coated bumpers and parts molded from polyvinyl chloride.

The invention claimed is:

1. A coating composition which comprises 40 to 60 percent by volume, based on the total volume of the coating composition, of Composition I and correspondingly 60 to 40 percent by volume of Composition II;

wherein Composition I consists essentially of 10–50 percent by weight of film-forming binder and correspondingly 90–50 percent by weight of an organic solvent for the binder wherein the binder consists essentially of
   1. 35–65 percent by weight, based on the weight of the binder, of a copolymer consisting essentially of the reaction product of 80–90 percent by weight of methyl methacrylate and correspondingly 10–20 percent by weight of an alkyl acrylate or an alkyl methacrylate having 2–12 carbon atoms in the alkyl groups;
   2. 5–20 percent by weight, based on the weight of the binder, of a copolymer consisting essentially of the reaction product of 85–98 percent by weight of methyl methacrylate and 2–15 percent by weight of polymerized adhesion promoting monomer of the formula

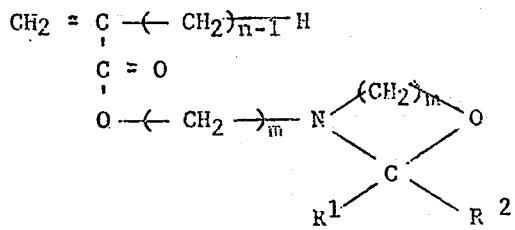

wherein $n$ is 1–2, $m$ is 2–3 and $R^1$ and $R^2$ are selected from the group consisting of hydrogen, phenyl, benzyl, an alkyl group having 1–12 carbon atoms, or in combination are 2,2-spirocyclohexyl; and
   3. 30–50 percent by weight, based on the weight of the binder, of an organic plasticizer of a phthalate ester or an alkyd resin;

and wherein Composition II comprises a pigmented coating composition containing 0.1–20 percent by weight pigment and 10–50 percent by weight of a film forming binder which consists essentially of
   1. 40–75 percent by weight, based on the weight of the binder, of polymethyl methacrylate or a copolymer of methyl methacrylate and diethyl aminoethyl methacrylate or a mixture of polymethyl methacrylate and a copolymer of methyl methacrylate and diethyl aminoethyl methacrylate;
   2. 10–30 percent by weight, based on the weight of the binder, of cellulose acetate butyrate having a 0.1–20 second viscosity and a butyryl content of about 30–55 percent by weight; and
   3. 15–30 percent by weight, based on the weight of the binder, of an organic plasticizer of a phthalate ester or an alkyd resin.

2. The coating composition of claim 1 in which the binder of Composition I consists essentially of
   1. 35–65 percent by weight, based on the weight of the binder, of a copolymer of the reaction product of 80–90 percent by weight of methyl methacrylate and 20–10 percent by weight of butyl acrylate;
   2. 5–20 percent by weight, based on the weight of the binder, of a copolymer of the reaction product of 85–95 percent by weight of methyl methacrylate and 15–5 percent by weight of 3-(2-methacryloxyethyl)-2,2-spirocyclohexyl oxazolidine; and
   3. 30–50 percent by weight, based on the weight of the binder, of butyl benzyl phthalate.

3. The coating composition of claim 1 in which the binder of Composition I consists essentially of
   1. 46–56 percent by weight, based on the weight of the binder, of a copolymer of the reaction product of 82 percent by weight of methyl methacrylate and 18 percent by weight of butyl acrylate;
   2. 10–14 percent by weight, based on the weight of the binder, of a copolymer of the reaction product of 95 percent by weight of methyl methacrylate and 5 percent by weight of 3-(2-methacryloxyethyl)-2,2-spirocyclohexyl oxazolidine; and
   3. 38–42 percent by weight, based on the weight of the binder, of butyl benzyl phthalate.

4. The coating composition of claim 1 in which the binder of Composition I consists essentially of
   1. 46–56 percent by weight, based on the weight of the binder, of a copolymer of the reaction product of 82 percent by weight of methyl methacrylate and 18 percent by weight of butyl acrylate;
   2. 10–14 percent by weight, based on the weight of the binder, of a copolymer of the reaction product of 95 percent by weight of methyl methacrylate and 5 percent by weight of 3-(2-methacryloxyethyl)-2,2-spirocyclohexyl oxazolidine; and
   3. 38–42 percent by weight, based on the weight of the binder, of butyl benzyl phthalate;
   and in which the binder of Composition II consists essentially of
   1. 15–35 percent by weight, based on the weight of the binder, of polymethyl methacrylate;
   2. 5–15 percent by weight, based on the weight of the binder, of a copolymer of methyl methacrylate and diethyl aminoethyl methacrylate;
   3. 25–35 percent by weight, based on the weight of the binder, of a copolymer of methyl methacrylate and butyl acrylate;
   4. 15–30 percent by weight, based on the weight of the binder of cellulose acetate butyrate having a 1–3 second viscosity, and a butyryl content of 30–55 percent by weight; and
   5. 20–30 percent by weight, based on the weight of the binder, of a plasticizer of an alkyd resin of coconut oil/ethylene glycol phthalate or butyl benzyl phthalate.

* * * * *